(12) United States Patent
Gerst, III et al.

(10) Patent No.: US 8,061,614 B2
(45) Date of Patent: Nov. 22, 2011

(54) LIGHT PIPE ILLUMINATION SYSTEM AND METHOD

(75) Inventors: Carl W. Gerst, III, Boston, MA (US);
William H. Equitz, Waban, MA (US);
Justin Testa, Wellesley, MA (US);
Sateesh Nadabar, Framingham, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 0 days.

(21) Appl. No.: 12/900,593

(22) Filed: Oct. 8, 2010

(65) Prior Publication Data
US 2011/0024504 A1 Feb. 3, 2011

Related U.S. Application Data

(63) Continuation of application No. 10/693,626, filed on Oct. 24, 2003, now Pat. No. 7,823,783.

(51) Int. Cl.
*G06K 7/10* (2006.01)
(52) U.S. Cl. ............ 235/455; 235/472.01; 235/472.02; 235/462.42; 385/43; 250/234; 710/300
(58) Field of Classification Search .................. 235/455, 235/472.01, 472.02, 462.42; 385/43; 250/234; 710/300
See application file for complete search history.

(56) References Cited

U.S. PATENT DOCUMENTS

| | | | |
|---|---|---|---|
| 2,357,378 A | 9/1944 | Benford | |
| 3,726,998 A | 4/1973 | Szpak et al. | |
| 3,857,626 A | 12/1974 | Rosenberger et al. | |
| 3,961,198 A | 6/1976 | Aungst et al. | |
| 4,282,425 A | 8/1981 | Chadima et al. | |
| 4,570,057 A | 2/1986 | Chadima, Jr. et al. | |
| 4,743,773 A | 5/1988 | Katana et al. | |

(Continued)

FOREIGN PATENT DOCUMENTS

CN 1426570 6/2003

(Continued)

OTHER PUBLICATIONS

CCS Inc., "LFX-series Lights", http://www.ccs-inc.co.jp/cgi-bin/hp.cgi?menu=102-115-01e, Feb. 2, 2009.

(Continued)

*Primary Examiner* — Allyson N Trail

(57) ABSTRACT

A system and method is provided for illuminating a subject using a light pipe that transmits light from a source, such as an LED ring illuminator to an outlet that directs the light appropriately as either bright field illumination, dark field illumination or both. The light pipe can include concentric cylinders, typically with a bright field illuminator nested within a dark field illuminator. The tip of the dark field illuminator may be angled so as to internally reflect light inwardly toward the central optical axis of a camera at a low angle. The tip can be located near the focal plane of the camera for the desired field of view. The field of view of the camera sensor can be modified to reject data outside of a illumination field of a particular shape. This illumination field can be created by shaping the light pipe in a predetermined form that projects the modified illumination field. Likewise, a set of aiming illuminators (in, for example, a noticeable color) can be provided around the perimeter of the light pipe to delineate outer boundaries of the illumination field or area of interest. These approaches facilitate better aiming of the sensor into the desired area of interest so that it is illuminated and/or acquired most-fully.

19 Claims, 10 Drawing Sheets

U.S. PATENT DOCUMENTS

| | | | |
|---|---|---|---|
| 4,766,300 A | 8/1988 | Chadima, Jr. et al. |
| 4,820,911 A | 4/1989 | Arackellian et al. |
| 4,894,523 A | 1/1990 | Chadima et al. |
| 4,969,037 A | 11/1990 | Poleschinski et al. |
| 5,019,699 A | 5/1991 | Koenck |
| 5,149,948 A | 9/1992 | Chisholm |
| 5,177,346 A | 1/1993 | Chisholm |
| 5,202,817 A | 4/1993 | Koenck |
| 5,227,614 A | 7/1993 | Danielson et al. |
| 5,239,169 A | 8/1993 | Thomas |
| 5,258,606 A | 11/1993 | Chadima, Jr. et al. |
| 5,291,009 A | 3/1994 | Rotaei |
| 5,313,373 A | 5/1994 | Bjorner et al. |
| 5,319,182 A | 6/1994 | Havens et al. |
| 5,331,176 A | 7/1994 | San't Anselmo et al. |
| 5,349,172 A | 9/1994 | Rotaei |
| 5,354,977 A | 10/1994 | Rotaie |
| 5,359,185 A | 10/1994 | Hanson |
| 5,367,439 A | 11/1994 | Maver et al. |
| 5,374,817 A | 12/1994 | Bard et al. |
| 5,378,883 A | 1/1995 | Batterman et al. |
| 5,406,060 A | 4/1995 | Gitin |
| 5,408,084 A | 4/1995 | Brandorff et al. |
| 5,414,251 A | 5/1995 | Durbin |
| 5,422,472 A | 6/1995 | Tavislan et al. |
| 5,430,285 A | 7/1995 | Karpen et al. |
| 5,449,892 A | 9/1995 | Yamada |
| 5,461,417 A | 10/1995 | White et al. |
| 5,463,214 A | 10/1995 | Longacre, Jr. et al. |
| 5,469,294 A | 11/1995 | Wilt et al. |
| 5,481,098 A | 1/1996 | Davis et al. |
| 5,484,994 A | 1/1996 | Rotaei |
| 5,500,516 A | 3/1996 | Durbin |
| 5,504,317 A | 4/1996 | Takahashi |
| 5,504,367 A | 4/1996 | Wang et al. |
| 5,514,858 A | 5/1996 | Ackley |
| 5,515,452 A | 5/1996 | Penkethman et al. |
| 5,532,467 A | 7/1996 | Rotaei et al. |
| 5,569,902 A | 10/1996 | Wood et al. |
| 5,585,616 A | 12/1996 | Roxby et al. |
| 5,586,212 A | 12/1996 | McConica et al. |
| 5,591,955 A | 1/1997 | Laser |
| 5,598,007 A | 1/1997 | Bunce et al. |
| 5,606,160 A | 2/1997 | Tani et al. |
| 5,619,029 A | 4/1997 | Roxby et al. |
| 5,623,137 A | 4/1997 | Powers et al. |
| 5,654,540 A | 8/1997 | Stanton et al. |
| 5,659,167 A | 8/1997 | Wang et al. |
| 5,684,290 A | 11/1997 | Arackellian et al. |
| 5,696,321 A | 12/1997 | Danielson et al. |
| 5,697,699 A | 12/1997 | Seo et al. |
| 5,703,348 A | 12/1997 | Suzuki et al. |
| 5,715,095 A | 2/1998 | Hiratsuka et al. |
| 5,723,868 A | 3/1998 | Hammond, Jr. et al. |
| 5,734,153 A | 3/1998 | Swartz et al. |
| 5,743,633 A | 4/1998 | Chau et al. |
| 5,750,974 A | 5/1998 | Sasaki et al. |
| 5,756,981 A | 5/1998 | Rotaei et al. |
| 5,773,810 A | 6/1998 | Hussey et al. |
| 5,777,314 A | 7/1998 | Rotaei |
| 5,780,834 A | 7/1998 | Havens et al. |
| 5,783,811 A | 7/1998 | Feng et al. |
| 5,786,586 A | 7/1998 | Pidhimy et al. |
| 5,793,033 A | 8/1998 | Feng et al. |
| 5,811,784 A | 9/1998 | Tach et al. |
| 5,834,754 A | 11/1998 | Feng et al. |
| 5,859,418 A | 1/1999 | Li et al. |
| 5,861,910 A | 1/1999 | McGarry et al. |
| 5,886,338 A | 3/1999 | Arackellian et al. |
| 5,894,348 A | 4/1999 | Bacchi et al. |
| 5,903,391 A | 5/1999 | Toshima et al. |
| 5,907,148 A | 5/1999 | Iwafuchi et al. |
| 5,919,057 A | 7/1999 | Feng |
| 5,920,643 A | 7/1999 | White et al. |
| 5,923,020 A | 7/1999 | Kurokawa et al. |
| 5,949,057 A | 9/1999 | Feng |
| 5,949,763 A | 9/1999 | Feng |
| 5,969,321 A | 10/1999 | Danielson et al. |
| 5,979,763 A | 11/1999 | Wang et al. |
| 5,984,494 A | 11/1999 | Chapman et al. |
| 5,992,751 A | 11/1999 | Laser |
| 6,011,586 A | 1/2000 | Lepior et al. |
| 6,022,124 A | 2/2000 | Bourn et al. |
| 6,033,090 A | 3/2000 | Seo |
| 6,034,379 A | 3/2000 | Bunte et al. |
| 6,036,095 A | 3/2000 | Seo |
| 6,039,254 A | 3/2000 | FroesePeeck et al. |
| 6,039,255 A | 3/2000 | Seo |
| 6,042,012 A | 3/2000 | Olmstead et al. |
| 6,045,047 A | 4/2000 | Pidhimy et al. |
| 6,060,722 A | 5/2000 | Havens et al. |
| 6,065,678 A | 5/2000 | Li et al. |
| 6,073,852 A | 6/2000 | Seo |
| 6,105,869 A | 8/2000 | Scharf et al. |
| 6,119,939 A | 9/2000 | Schwartz et al. |
| 6,141,046 A | 10/2000 | Roth et al. |
| 6,158,661 A | 12/2000 | Chadima, Jr. et al. |
| 6,164,544 A | 12/2000 | Schwartz et al. |
| 6,210,013 B1 | 4/2001 | Bofield |
| 6,223,986 B1 | 5/2001 | Bobba et al. |
| 6,234,397 B1 | 5/2001 | He et al. |
| 6,247,645 B1 | 6/2001 | Harris et al. |
| 6,249,008 B1 | 6/2001 | Bunte et al. |
| 6,250,551 B1 | 6/2001 | He et al. |
| 6,260,763 B1 | 7/2001 | Svetal |
| 6,267,294 B1 | 7/2001 | Stern et al. |
| 6,283,374 B1 | 9/2001 | Fantone et al. |
| 6,340,114 B1 | 1/2002 | Correa et al. |
| 6,341,878 B1 | 1/2002 | Chiang |
| 6,347,163 B2 | 2/2002 | Rotaei et al. |
| 6,347,874 B1 | 2/2002 | Boyd et al. |
| 6,352,204 B2 | 3/2002 | Hattersley et al. |
| 6,360,948 B1 | 3/2002 | Yang et al. |
| 6,371,374 B1 | 4/2002 | Schwartz et al. |
| 6,385,352 B1 | 5/2002 | Rotaei |
| 6,385,507 B1 | 5/2002 | Buijtels et al. |
| 6,394,349 B1 | 5/2002 | Shigeka et al. |
| 6,405,925 B2 | 6/2002 | He et al. |
| 6,429,934 B1 | 8/2002 | Dunn et al. |
| 6,435,411 B1 | 8/2002 | Massieu et al. |
| 6,491,223 B1 | 12/2002 | Longacre, Jr. et al. |
| 6,505,778 B1 | 1/2003 | Reddersen et al. |
| 6,513,714 B1 | 2/2003 | Davis et al. |
| 6,547,146 B1 | 4/2003 | Meksavan et al. |
| 6,575,367 B1 | 6/2003 | Longacre, Jr. |
| 6,581,838 B1 | 6/2003 | Meksavan et al. |
| 6,592,040 B2 | 7/2003 | Barkan |
| 6,595,422 B1 | 7/2003 | Doljack |
| 6,598,797 B2 | 7/2003 | Lee |
| 6,601,768 B2 | 8/2003 | McCall et al. |
| 6,607,128 B1 | 8/2003 | Schwartz et al. |
| 6,607,132 B1 | 8/2003 | Dvorkis et al. |
| 6,621,065 B1 | 9/2003 | Fukumoto et al. |
| 6,659,350 B2 | 12/2003 | Schwartz et al. |
| 6,661,521 B1 | 12/2003 | Stern |
| 6,681,037 B1 | 1/2004 | Koljonen |
| 6,689,998 B1 | 2/2004 | Brenner |
| 6,729,546 B2 | 5/2004 | Rotaei |
| 6,760,165 B2 | 7/2004 | Wulff et al. |
| 6,803,088 B2 | 10/2004 | Kaminsky et al. |
| 6,809,847 B2 | 10/2004 | McQueen |
| 6,831,290 B2 | 12/2004 | Mentzer |
| 6,832,725 B2 | 12/2004 | Gardiner et al. |
| 6,854,650 B2 | 2/2005 | Hattersley et al. |
| 6,855,650 B1 | 2/2005 | Hattersley et al. |
| 6,860,428 B1 | 3/2005 | Dowling et al. |
| 6,914,679 B2 | 7/2005 | Nettekoven et al. |
| 7,021,542 B2 | 4/2006 | Patel et al. |
| 7,025,271 B2 | 4/2006 | Dvorkis et al. |
| 7,025,272 B2 | 4/2006 | Yavid et al. |
| 7,025,273 B2 | 4/2006 | Breytman et al. |
| 7,038,853 B2 | 5/2006 | Li et al. |
| 7,044,377 B2 | 5/2006 | Patel et al. |
| 7,090,132 B2 | 8/2006 | Havens et al. |
| 7,128,266 B2 | 10/2006 | Zhu et al. |
| 7,131,587 B2 | 11/2006 | He et al. |
| 7,159,764 B1 | 1/2007 | White et al. |

| | | |
|---|---|---|
| 7,163,149 B2 | 1/2007 | He et al. |
| 7,180,052 B1 | 2/2007 | Barkan et al. |
| 7,187,825 B2 | 3/2007 | Lim et al. |
| 7,204,418 B2 | 4/2007 | Josep et al. |
| 7,204,420 B2 | 4/2007 | Barken et al. |
| 7,224,540 B2 | 5/2007 | Olmstead et al. |
| 7,225,989 B2 | 6/2007 | Zhu et al. |
| 7,240,844 B2 | 7/2007 | Zhu et al. |
| 7,253,384 B2 | 8/2007 | Barnes et al. |
| 7,267,282 B2 | 9/2007 | Zhu et al. |
| 7,270,274 B2 | 9/2007 | Hennick et al. |
| 7,278,575 B2 | 10/2007 | Zhu et al. |
| 7,281,661 B2 | 10/2007 | Zhu et al. |
| 7,296,749 B2 | 11/2007 | Massieu |
| 7,306,155 B2 | 12/2007 | Hennick et al. |
| 7,314,173 B2 | 1/2008 | Philyaw et al. |
| 7,331,524 B2 | 2/2008 | Vinogradov et al. |
| 7,360,705 B2 | 4/2008 | Jolivet et al. |
| 7,451,917 B2 | 11/2008 | McCall et al. |
| 7,490,774 B2 | 2/2009 | Zhu et al. |
| 7,520,434 B2 | 4/2009 | Jolivet et al. |
| 7,568,628 B2 | 8/2009 | Wang et al. |
| 7,604,174 B2 | 10/2009 | Gerst et al. |
| 7,823,783 B2 | 11/2010 | Gerst et al. |
| 2001/0027999 A1 | 10/2001 | Lee |
| 2002/0000472 A1* | 1/2002 | Hattersley et al. ........ 235/472.01 |
| 2002/0030094 A1* | 3/2002 | Curry et al. .................. 235/375 |
| 2002/0074403 A1 | 6/2002 | Krichever et al. |
| 2002/0096566 A1 | 7/2002 | Schwartz et al. |
| 2002/0104887 A1* | 8/2002 | Schlieffers et al. ....... 235/472.02 |
| 2002/0125322 A1* | 9/2002 | McCall et al. ........... 235/462.42 |
| 2002/0170970 A1 | 11/2002 | Ehrhart |
| 2003/0001018 A1 | 1/2003 | Hussey et al. |
| 2003/0029917 A1 | 2/2003 | Hennick et al. |
| 2003/0034394 A1 | 2/2003 | Gannon et al. |
| 2003/0058631 A1 | 3/2003 | Yoneda |
| 2003/0062413 A1 | 4/2003 | Gardiner et al. |
| 2003/0062418 A1 | 4/2003 | Barber et al. |
| 2003/0080187 A1 | 5/2003 | Piva et al. |
| 2003/0080189 A1* | 5/2003 | Patel et al. ................... 235/454 |
| 2003/0163623 A1* | 8/2003 | Yeung .......................... 710/300 |
| 2004/0069855 A1 | 4/2004 | Patel et al. |
| 2004/0156539 A1* | 8/2004 | Jansson et al. ................ 382/145 |
| 2004/0217173 A1* | 11/2004 | Lizotte et al. ............ 235/462.01 |
| 2004/0238637 A1* | 12/2004 | Russell et al. ........... 235/462.14 |
| 2005/0029439 A1* | 2/2005 | Benedict ...................... 250/234 |
| 2005/0047723 A1* | 3/2005 | Li ................................... 385/43 |
| 2005/0117144 A1 | 6/2005 | Greenway et al. |
| 2005/0180037 A1 | 8/2005 | Masterson |
| 2005/0199725 A1 | 9/2005 | Caraen et al. |
| 2006/0027657 A1 | 2/2006 | Nunnink et al. |
| 2006/0027659 A1 | 2/2006 | Patel et al. |
| 2006/0032921 A1 | 2/2006 | Gerst et al. |
| 2006/0131419 A1 | 6/2006 | Nunnink |
| 2006/0133757 A1 | 6/2006 | Nunnink |
| 2006/0266840 A1 | 11/2006 | Vinogradov et al. |
| 2007/0090193 A1 | 4/2007 | Nunnink et al. |
| 2007/0091332 A1 | 4/2007 | Nunnink |
| 2007/0152064 A1 | 7/2007 | Nunnink et al. |
| 2007/0206183 A1 | 9/2007 | Lebens |
| 2008/0170380 A1 | 7/2008 | Pastore |

FOREIGN PATENT DOCUMENTS

| | | |
|---|---|---|
| DE | 3737792 | 5/1989 |
| DE | 3931044 | 3/1991 |
| DE | 4003983 | 8/1991 |
| DE | 4123916 | 1/1992 |
| DE | 10026301 | 11/2001 |
| DE | 10113426 | 9/2002 |
| EP | 0185 782 | 3/1989 |
| EP | 0356680 | 3/1990 |
| EP | 1158460 | 11/2001 |
| EP | 1687752 | 2/2008 |
| JP | S53-62387 | 6/1978 |
| JP | H3-53784 | 3/1991 |
| JP | 04-223583 | 8/1992 |
| JP | 06124361 | 5/1994 |
| JP | 08129597 | 5/1996 |
| JP | 08287176 | 11/1996 |
| JP | 10134133 | 5/1998 |
| JP | 2000-231600 | 8/2000 |
| JP | 2001-307011 | 11/2001 |
| JP | 200728088 | 1/2007 |
| WO | WO 9112489 | 8/1991 |
| WO | WO-9216909 | 10/1992 |
| WO | WO 9949347 | 9/1999 |
| WO | WO 0016073 | 3/2000 |
| WO | WO 0163258 | 8/2001 |
| WO | WO-0165469 | 9/2001 |
| WO | WO 02075637 | 9/2002 |
| WO | WO 2004006438 | 1/2004 |
| WO | WO 2005041556 | 5/2005 |
| WO | WO 2005043449 | 5/2005 |

OTHER PUBLICATIONS

Cognex Corporation, "DataMan 7500 Series Handheld Models", *Cognex Machine Vision System and Machine Vision Sensors*, (2009).

"Vision-Supplies.com", *Siemens LytePipe* 1.5 x 30, (1999), Cognex Corporation, "DataMan 6500 Series", *Quick Reference Guide*, (Aug. 10, 2004).

Cognex Corporation, "AcuReader/OCR", *Accurate, Fast Wafer Indentification*, (1995-1996).

"PCT Search Report", PCT/2004/034389, pp. 1-18, dated May 2, 2005.

"PCT Search Report", PCT/2004/034872, pp. 1-19, dated Feb. 24, 2005.

File wrapper for European patent No. 1687752, dated Dec. 5, 2005-Jun. 27, 2011 (European application claiming priority to US patent No. 7,823,783)(3 parts attached).

* cited by examiner

LIGHT PIPE ILLUMINATION SYSTEM AND METHOD

CROSS REFERENCE TO RELATED APPLICATIONS

This application is a continuation of U.S. patent application Ser. No. 10/693,626, filed on Oct. 24, 2003 now U.S. Pat. No. 7,823,783, and entitled "Light Pipe Illumination System and Method," which is hereby incorporated by reference.

FIELD OF THE INVENTION

This invention relates to illuminators and more particularly to illuminators for image acquisition devices and machine vision systems.

BACKGROUND OF THE INVENTION

Machine vision systems use image acquisition devices that include camera sensors to deliver information on a viewed subject. The system then interprets this information according to a variety of algorithms to perform a programmed decision-making and/or identification function. For an image to be most-effectively acquired by a sensor in the visible, and near-visible light range, the subject should be properly illuminated.

In the example of barcode scanning using an image sensor, good lighting is highly desirable. Barcode scanning entails the aiming of an image acquisition sensor (CMOS camera, CCD, etc.) at a location on an object that contains a bar code, and retrieval of an image of that barcode. The bar code contains a set of predetermined patterns that represent an ordered group of characters or symbols from which an attached data processor (for example a microcomputer) can derive useful information about the object (e.g., its serial number, type, model, price, etc.). Barcodes are available in a variety of shapes and sizes. Two of the most commonly employed barcode types are the so-called one-dimensional barcode, consisting a line of vertical stripes of varying width and spacing, and the so-called two-dimensional barcode consisting of a two-dimensional array of dots or rectangles.

In reading barcodes or other subjects of interest the type of illumination employed is of concern. Where barcodes and other viewed subjects are printed on a flat surface with contrasting ink or paint, a diffuse, high-angle "bright field" illumination may best highlight these features for the sensor. By high-angle it is meant, generally, light that strikes the subject nearly perpendicularly (normal) or at an angle that is typically no less than about 45 degrees from perpendicular (normal) to the surface of the item being scanned. Such illumination is subject to substantial reflection back toward the sensor. By way of example, barcodes and other subjects requiring mainly bright field illumination may be present on a printed label adhered to an item or container, or on a printed field in a relatively smooth area of item or container.

Conversely, where a barcode or other subject is formed on a more-irregular surface or is created by etching or peening a pattern directly on the surface, the use of highly reflective bright field illumination may be inappropriate. A peened/etched surface has two-dimensional properties that tend to scatter bright field illumination, thereby obscuring the acquired image. Where a viewed subject has such decidedly two-dimensional surface texture, it is best illuminated with dark field illumination. This is an illumination with a characteristic low angle (approximately 45 degrees or less, for example) with respect to the surface of the subject (i.e. an angle of more than approximately 45 degrees with respect to normal). Using such low-angle, dark field illumination, two-dimensional surface texture is contrasted more effectively (with indents appearing as bright spots and the surroundings as shadow) for better image acquisition.

To take full advantage of the versatility of a camera image sensor, it is desirable to provide both bright field and dark field illumination for selective or simultaneous illumination of a subject. However, dark field illumination must be presented close to a subject to attain the low incidence angle thereto. Conversely, bright field illumination is better produced at a relative distance to ensure full area illumination.

In addition, a current-production sensor may have a resolution of 640×480 (over 300 K) or 1280×1024 (over 1.3 M) pixels within its native field of view. This resolution is desirable for attaining an accurate image of the subject. However, processing speed may be compromised by the need to acquire every pixel in the field of view even if the subject is a relatively small part of that field (for example, the narrow strip of a one-dimensional barcode). If the field of view is to be narrowed to only encompass an area of interest, then a system for aiming the camera onto that area of interest is desirable. Likewise, where a given field of view may contain multiple codes or subjects, the ability to focus upon particular parts of that field of view to discern the selected subject is also desirable.

SUMMARY OF THE INVENTION

This invention overcomes the disadvantages of the prior art by providing a system and method for illuminating a subject using a light pipe that transmits light from a source, such as an LED ring illuminator to an outlet that directs the light appropriately as either bright field illumination, dark field illumination or both. The light pipe can include concentric or coaxial (nested) cylinders, typically with a bright field illuminator nested within a dark field illuminator. The tip of the dark field illuminator is angled so as to internally reflect light inwardly toward the central optical axis of a camera at a low angle. The tip can be located near the focal plane of the camera for the desired field of view. The field of view of the camera sensor can be modified to reject data outside of a illumination field of a particular shape. This illumination field can be created by shaping the light pipe in a predetermined form that projects the modified illumination field. Likewise, a set of aiming illuminators (in, for example, a noticeable color) can be provided around the perimeter of the light pipe to delineate outer boundaries of the illumination field or area of interest. These approaches facilitate better aiming of the sensor into the desired area of interest so that it is illuminated and/or acquired most-fully.

According to various embodiments herein, a dark field illuminator, bright field illuminator or combination of dark field and bright field illuminator can be provided using an appropriate light pipe or nested light pipes. A camera sensor is provided within the interior of the light pipe arrangement with appropriate optics to view the subject through a channel formed by the innermost wall of the light-pipe arrangement. In one embodiment, the dark field illuminator light element (for example, a ring of light sources/LEDs) can be divided into segments so that the pattern of light can be modulated relative to the circumference of the illuminator.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
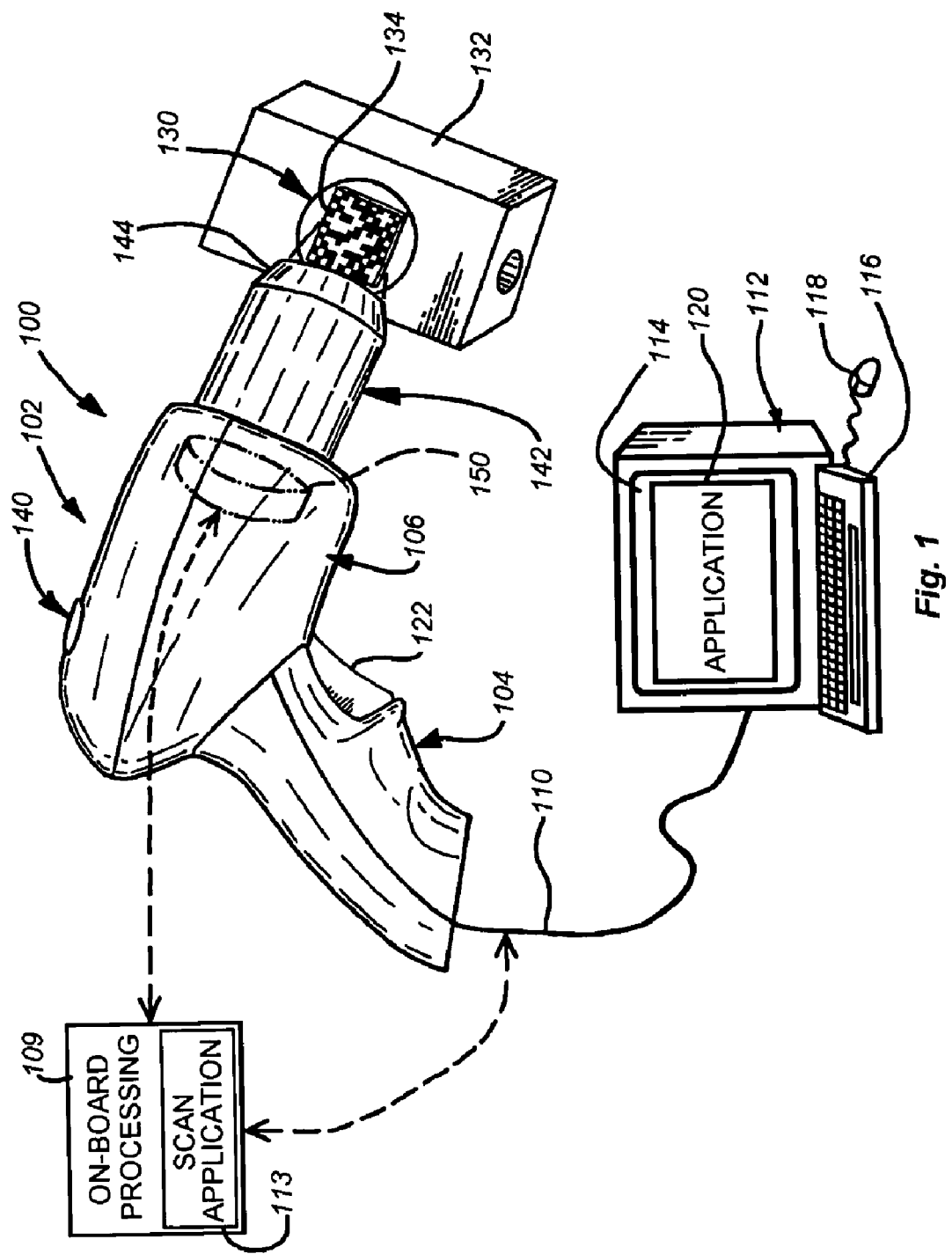
FIG. 1 is a perspective view of a handheld scanning system and subject employing a light pipe illuminator according to an embodiment of this invention.

FIG. 1 shows a scanning system 100 adapted for handheld operation. An exemplary handheld scanning appliance or handpiece 102 is provided. It includes a grip section 104 and a body section 106. The sensor and other functional components described herein can be controlled and can direct image data to an on-board/embedded processor 109. This processor can include a scanning software application 113 by which lighting is controlled, images are acquired and image data is interpreted into usable information (for example, alphanumeric strings derived from the barcode images). The decoded information can be directed via a cable 110 to a PC or other data storage device 112 having (for example) a display 114, keyboard 116 and mouse 118, where it can be stored and further manipulated using an appropriate application 120. Alternatively, the cable 110 can be directly connected to an interface in the scanning appliance and an appropriate interface in the computer 112. In this case the computer-based application 120 performs various image interpretation and lighting control functions as needed. The precise arrangement of the handheld scanning appliance with respect to an embedded processor, computer or other processor is highly variable. For example, a wireless interconnect can be provided in which no cable 110 is present. Likewise, the depicted microcomputer can be substituted with another processing device, including an onboard processor or a miniaturized processing unit such as a personal digital assistant or other small-scale computing device.

The scanning application 113 can be adapted to respond to inputs from the scanning appliance 102. For example, when the operator toggles a trigger 122 on the appliance 102, an internal camera image sensor (150, shown and described further below) acquires an image of a region of interest 130 on an item 132. The exemplary region of interest includes a two-dimensional bar code 134 that can be used to identify the part 132. Identification and other processing functions are carried out by the scanning application 113, based upon image data transmitted from the appliance 102 to the processor 109.

Simultaneously with, or in advance of acquisition of the image, the area of interest 130 is illuminated. In one embodiment, a switch 140 on the appliance 102 can be used to operate the illuminator, which consists of a novel light pipe arrangement 142 in accordance with this invention. Alternatively, as will be described below, the operation of the illuminator can be operated and controlled remotely by the scanning software application 120. The light pipe 142 consists of an extended barrel of light transmissive material terminating (in this embodiment) in an angled tip 144. As described further below, this tip is designed to cause internal reflection that projects a low-angle dark field illumination in the area of interest 130. As noted above, such dark field illumination is typically provided at an angle of no more than approximately 45 degrees with respect to the surface or more than 45 degrees normal to the optical axis. Extending through the center of the light pipe, which comprises a hollow tube, is a camera sensor 150 (shown in phantom and associated optics). The focal point of the camera is selected so that it is able to focus on the desired area of interest, as its field of view, in close proximity to the tip 144. In this manner, the tip can be placed very close to, or in contact with the area of interest for accurate viewing. As noted above, the bar code 134 in this embodiment is one that is best viewed using a dark field illumination. However, as will be described further below, the light pipes described in accordance with this invention also has the ability to provide bright field illumination for bar codes that are better suited to direct, high-angle illumination (for example, those printed with high contrast ink on a relatively smooth, matte surface).

Figure 2:
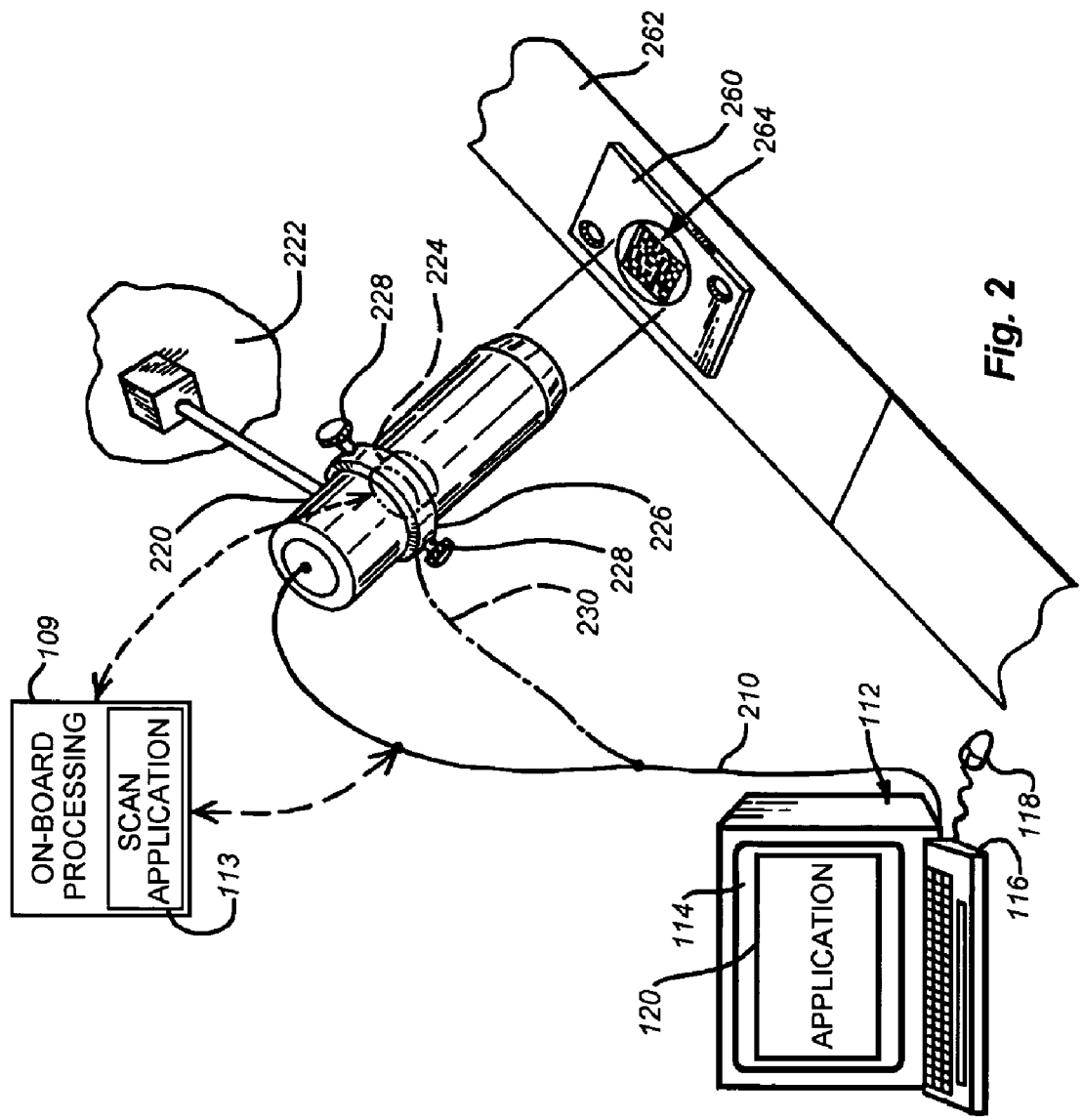
FIG. 2 is a perspective view of a fixedly mounted scanning system and subject employing a light pipe illuminator according to an embodiment of this invention.

FIG. 2 shows another implementation of the light pipe in accordance with an embodiment of this invention. An embedded processor 109 and/or computer 112 and associated applications 113 and/or 120 similar to those described above can be employed. An associated cable 210 interconnects the computer, via an interface, with a camera element 220. The camera element can be a conventional camera mounted on a fixed bracket 222. It includes a lens and electro-optical sensor assembly 224 (shown in phantom). The light pipe is removably mounted via a securing ring 226 with exemplary securing screws 228 in this embodiment. Note, while screws 228 are use, any fastener system can be substituted. A cable 230, shown in phantom, interconnects an internal ring illuminator, integral with light pipe, to either the processor 109 or the computer 112. This arrangement allows the light pipes of this invention to be secured as a retrofit to a variety of preexisting cameras. In any of the embodiments herein, the illuminator can be integrated with the camera's standard operating functions, such as its strobe and trigger mechanisms, or it can be controlled via the scanning application. Separate control circuitry can also be provided to modulate certain functions of the illuminator as described further below. In the example of FIG. 2, the illuminator is viewing parts or other items 216 moving along a conveyer 262. The area of interest 264 is a bar code that is best viewed using, for example, bright field illumination. As described below, the light pipe arrangement, in accordance with the various embodiments of this invention, can accommodate bright field illumination as well as dark field illumination. In both FIGS. 1 and 2, and other figures described herein, the image sensor is, typically, a commercially available CMOS or CCD image sensor with a resolution of, for example, 640×480 pixels or 1280×1024 pixels. Other resolutions and sensor types are expressly contemplated, however.

Figure 3:
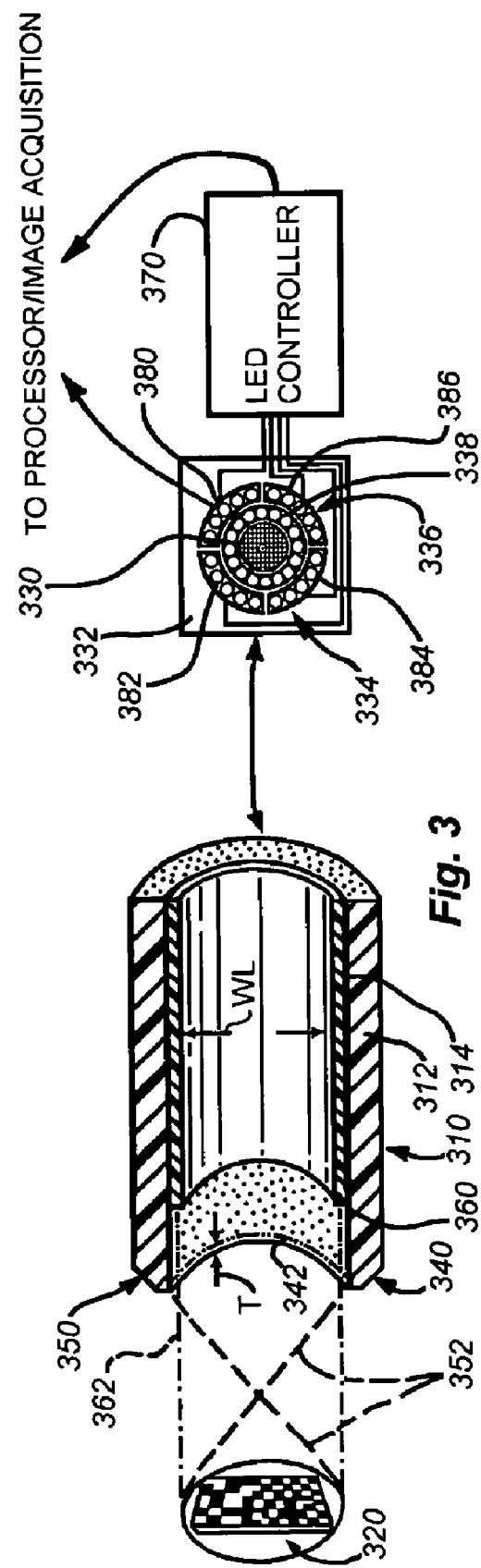
FIG. 3 is a schematic cross section of a light pipe and ring illuminator according to an embodiment of this invention.

With reference to FIG. 3, a version of the light pipe 310 described in FIGS. 1 and 2 is shown. This light pipe includes an outer tube 312 and a nested, inner tube 314. The innermost wall of the inner tube 314 defines, in this example, a circular lumen or channel. This channel is a path through which light can pass from the area of interest 320 to a board-mounted or separately placed sensor 330. The lumen has a diameter WL that is equal to or greater than the diameter of the optics of the camera sensor. In this embodiment, note that the sensor is mounted on a circuit board 332 that also includes the ring illuminator 334. This ring illuminator consists of an outer ring of LEDs or other appropriate light sources 336 and an inner ring 338 of LEDs or other appropriate light sources. The number of light sources, size of the rings and their shape are highly variable. Thus, the term "ring" should be taken broadly to describe a variety of regular and irregular curved (ovular, etc.) and/or polygonal (rectangular, square, etc.) perimeter shapes. In general, the ring illuminator's light sources are placed relatively close to the outer perimeter of the sensor and/or its optics and the number of sources is sufficient to fill in the illumination field and supply appropriate light to the subject. In general, any group of light sources or one or more continuous sources (e.g., tubes) arranged to light a perimeter of any size/shape can be broadly considered to be a "ring" light source herein. In one embodiment, the ring can define a circle that is approximately 3-4 inches in outer diameter. Each ring is aligned with respect to one of the light pipes 312 and 314. As described below, appropriate baffles separate the rings from each other so that light from one ring does not leak into the other ring.

As noted, each light pipe is constructed from a light-transmissive material. This material can be acrylic, glass, or any other material capable of acting as a wave guide for visible and near-visible light. The wall thickness of each pipe may vary. In general, thicknesses are between approximately ⅛ inch and ¼ inch. However, larger or smaller thicknesses are expressly contemplated. The overall length of the outer light pipe is also highly variable. As noted above, it is set so that the focus on the desired field of view is attained near, but beyond, the end of the tip 340. In one embodiment, the outer light pipe has a length of approximately 3-4 inches. The inner light pipe 314 can be approximately the same length as the outer light pipe, but in this embodiment, the inner light pipe is recessed with respect to the outer, as shown, so that light can exit from the inner edge of the tip 340. The tip's light-transmissive region is shown by the dashed line 342. This inner-edge light outlet can be formed by exposing and/or polishing a strip in the otherwise opaque overall surface of the outer light pipe 312. This light transmissive strip or region can extend (for example) ¼ inch, more or less, as shown by thickness T. The thickness T is variable. Due to internal reflection caused by the angled portion 350 of the tip 340, low angle illumination 352 exits from the open region 342. Similarly, the open tip 360 of the inner light pipe 314 facilitates direct, bright field illumination 362 on the area of interest 320. The mechanics of the nested light pipe 310 are described in further detail below.

Figure 4:
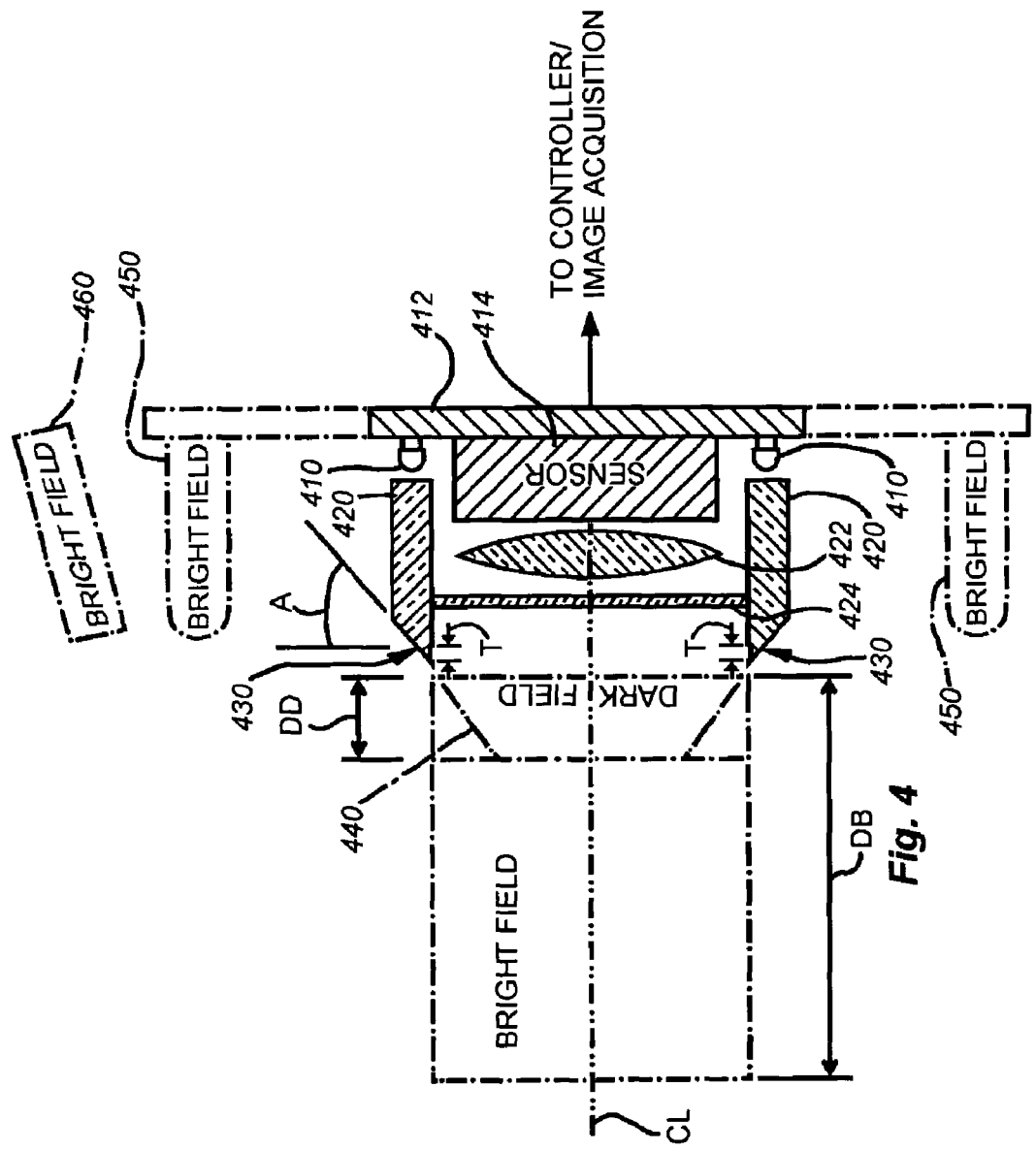
FIG. 4 is a side cross section of a sensor with dark field illuminating light pipe according to an embodiment of this invention.

Reference will first be made to FIG. 4, which describes, more particularly, a dark field illuminator. Reference will also be made generally to the ring illuminator 334 and controller 370 of FIG. 3.

Note that, while an opaque coating of paint or another acceptable material is used to insulate the dark field light pipe against light leakage, it is contemplated that all or a portion of the light pipe can remain uncovered, particularly where the surface is sufficiently well-polished to cause near-total internal reflection along its length.

As shown in FIG. 4, a single ring illuminator of LEDs or other light sources 410 may be provided on a circuit board 412 along with a CMOS, CCD or other electro-optical sensor 414. Note that the sensor, as described in any of the embodiments herein, may be separate from the light source's circuit board or combined with it. These elements interconnect to a controller and/or image acquisition processor similar to those shown in FIG. 3. A dark field-illuminating light pipe 420 is shown in cross-section. This surrounds the image sensor 414 and its associated optics 422. A transparent window 424 can be provided in front of the optics 422 to protect the circuitry. As noted above, the tip 430 of the light pipe 420 is angled at an angle A (approximately 45 degrees or more) so that light is reflected to pass through an exposed thickness T along the inner perimeter of the light pipe using internal reflection. The light transmits with the desired low-angle (or a high-angle (over 45 degrees) respect to optical axis centerline CL) dark field illumination patter 440 that, in this embodiment, is within a range DD of 0-1.25 inch. Note that the angle A of the tip (approximately 45 degrees in this example) determines the general angular range of light exiting the tip. There tends to be a spread of angles, in fact, and the prevailing angle of light may vary somewhat from the angle of the tip. The angle A of the tip may be altered to generate the best angle and spread for light based upon the material used for the light pipe and it's wall thickness.

As also shown in FIG. 4 an extended bright field range DB oD-4 inches extends beyond the dark field range. In one embodiment, the bright field is not illuminated or can be illuminated by a variety of other external sources. To this end, in an alternate embodiment, the dark field light source may further include an external bright field illuminator 450 and/or 460. In one example, the bright field illuminator is a ring light source (with or without a light pipe) 450 that mayor may not be mounted on the circuit board 412 (see board extensions shown in phantom). The radial spacing of the optional, external bright field ring is variable. It may closely abut the dark field light pipe 420, or may be spaced away from this light pipe as shown. According to another alternative, a bright field illuminator 460 may be provided at another external location or locations. Note that the term "external" as used herein should be taken broadly to include a location that is inside the lumen of the dark field light pipe, such as, for example at the base of the pipe (adjacent to the circuit board, for example). This illuminator can be provided as the only bright field illuminator, or in addition to the bright field ring 450.

In order to enhance the abilities of the dark field illuminator, the controller (see controller 370 in FIG. 3) interconnects with a number of segments of the LED ring. Referring again to FIG. 3, the depicted outer LED ring 336 has four exemplary segments that represent the quadrants 380, 382, 384 and 386 of the overall circumference. In this example, the controller 370 individually addresses each of the quadrants 380-386. In this manner, the quadrants can be separately controlled/modulated. They can be turned on or off, or dimmed and brightened selectively to provide the best dark field illumination pattern for a particular subject. It has been observed that illumination of metallic and similar materials is often more effective when oriented along the grain of the material. With the ability to dim or deactivate illumination across the grain, a significantly improved image is attained.

In one embodiment, the scanning application or another image processor can be used to determine the best lighting based upon the detected image's characteristics. This can entail a rapid cycling of light segments through a variety of preset on/off combinations until the best image quality is attained. This involves a feedback between the sensor, the scanning application and the LED controller. In other words, the sensor signal is processed by the scanning application for each different setting of the LEDs, and when an acceptable and/or optimal image is attained, that particular setting is chosen. Image optimization can be based upon recognition of known fiducials or detection of maximum contrast over a sufficiently wide portion of the viewed area of interest.

In a fixed-camera arrangement, this adjustment process can be carried out once, and the selected setting can be applied to each successive acquired image. Alternatively, in certain handheld scanning applications, where angles and orientations of the appliance relative to the item are likely to change, the adjustments can be made dynamically for each scan. Note that a fixed setting can also be chosen where the scan will always be taken from approximately the same location. Thus, it is contemplated that any of the dark field illuminators, including that shown in FIG. 4, can include a ring illuminator enabling selectable control, with an associated LED controller. It is also expressly contemplated that the control of LEDs can be implemented in a variety of ways and with a wide range of ring segmentation options. While four segments are shown in the embodiment of FIG. 3, it is contemplated, in alternate embodiments, that the ring may be divided into just two halves, or any larger number of segments can be employed. In fact, each LED may be separately controllable/addressable in one embodiment to attain the desired dark field illumination pattern.

As shown generally in the embodiment of in FIG. 3, the light pipe can include at least two nested (coaxial) light pipes for providing both dark field and bright field illumination in a single unit. The choice of whether dark field or bright field illumination best suits a particular subject can be made by the controller, image processor (automated) or by the operator (manual). According to an automated process, both bright field and dark field illumination can be attempted, and that which attains the best image quality is employed.

Figure 5:
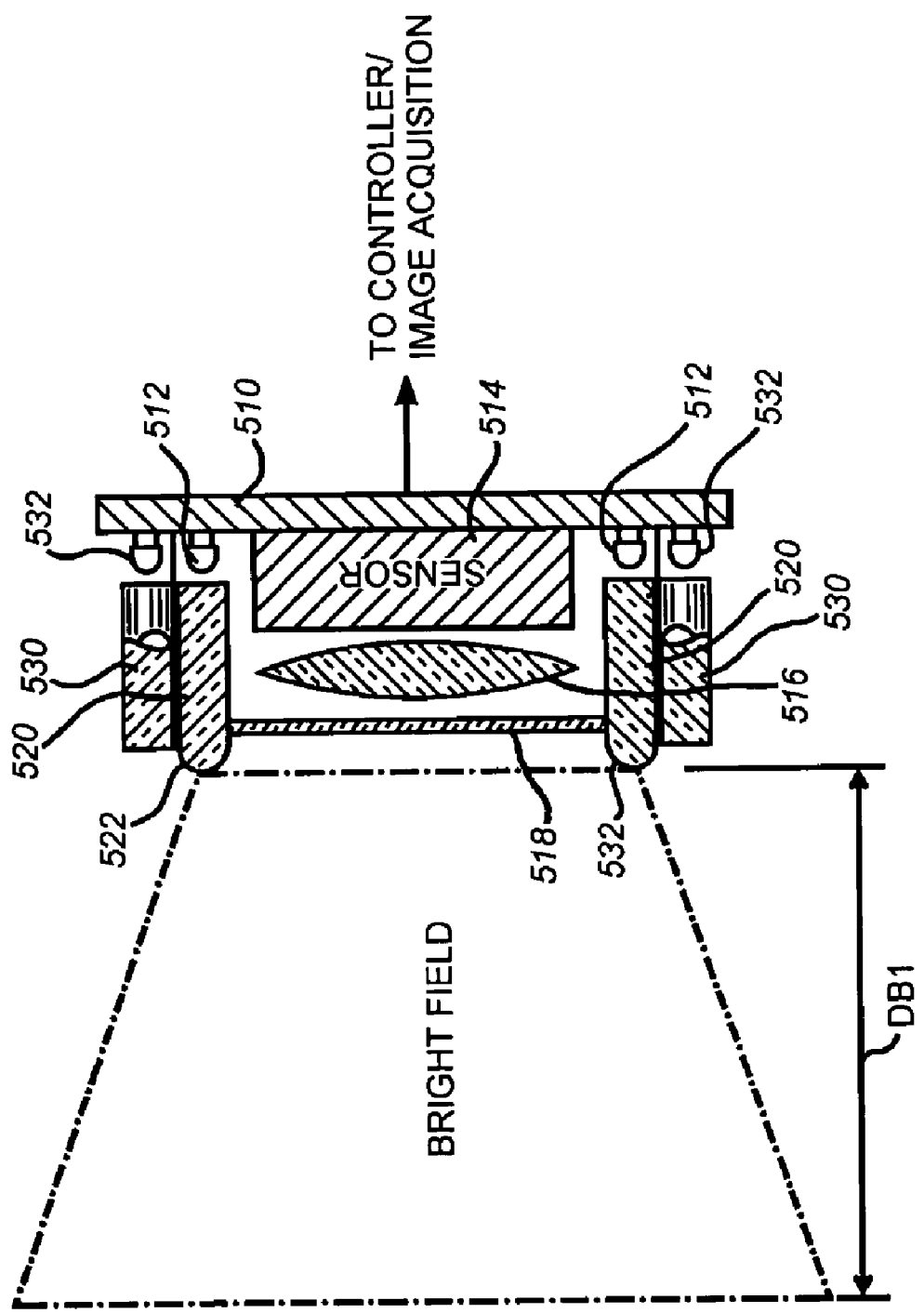
FIG. 5 is a side cross section of a sensor with bright field illuminating light pipe and aiming illuminators according to an embodiment of this invention.

With reference now to FIG. 5, a light pipe having only a bright field illuminator is shown. A circuit board, 510, carries LEDs 512 surrounding a sensor 514 with associated optics 516 and a window 518 to protect them. A light pipe 520 communicates optically with the ring illuminator LEDs 512. The tip 522 of the light pipe 520 can be rounded or flat and can include a diffusing (frosted, for example) surface texture for enhanced scatter of bright field light. Note that other bright field light pipes described herein can have similar tip constructions and surfaces. The walls (inner and outer) of the light pipe 522 can be coated with an opaque, non-transmissive material or can remain transmissive. Surrounding the outer circumference of the light pipe 520 at various points are each of a set of individual directing rods/lenses 530 (shown in partial cross-section for clarity of rod-like structure) that each optically communicate with individual or clusters of LEDs 532. Because the field of view of the sensor is limited, and the subject must remain within the field of view to be properly read, the LEDs 532 project aiming points, typically of a different, noticeable color onto the item of interest. For example the aiming LEDs can project a prominent blue, red or green dot while the overall illumination is a whitish light.

Note that the aiming point rods herein are circular in cross section. However, they may be triangular, square or any other shape that adequately denotes an aiming point.

Figure 6:
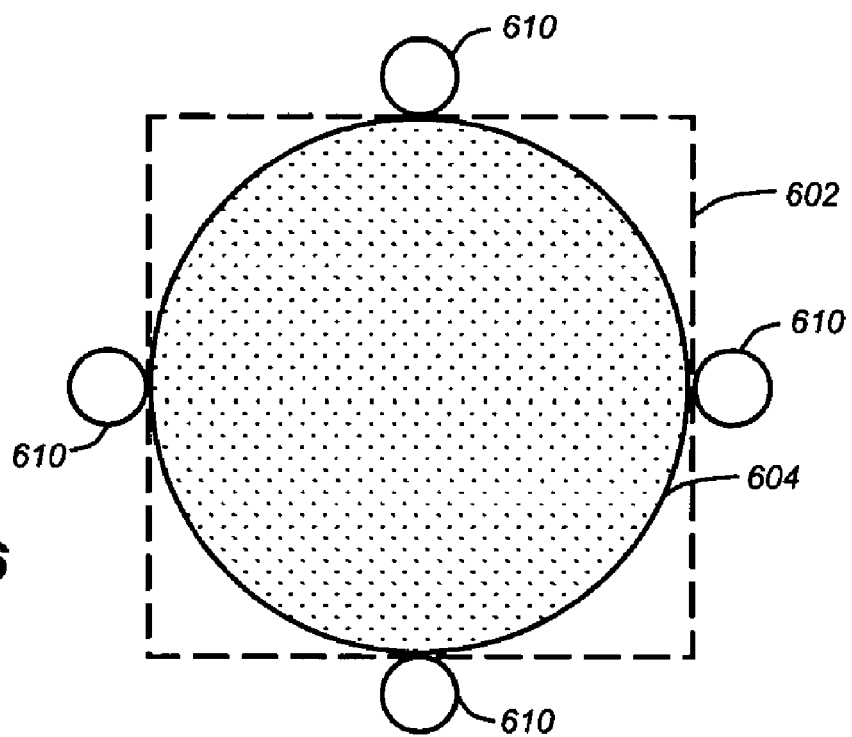
FIG. 6 is a plan view of a circular illumination pattern projected by the illuminating light pipe of FIG. 5.
Figure 7:
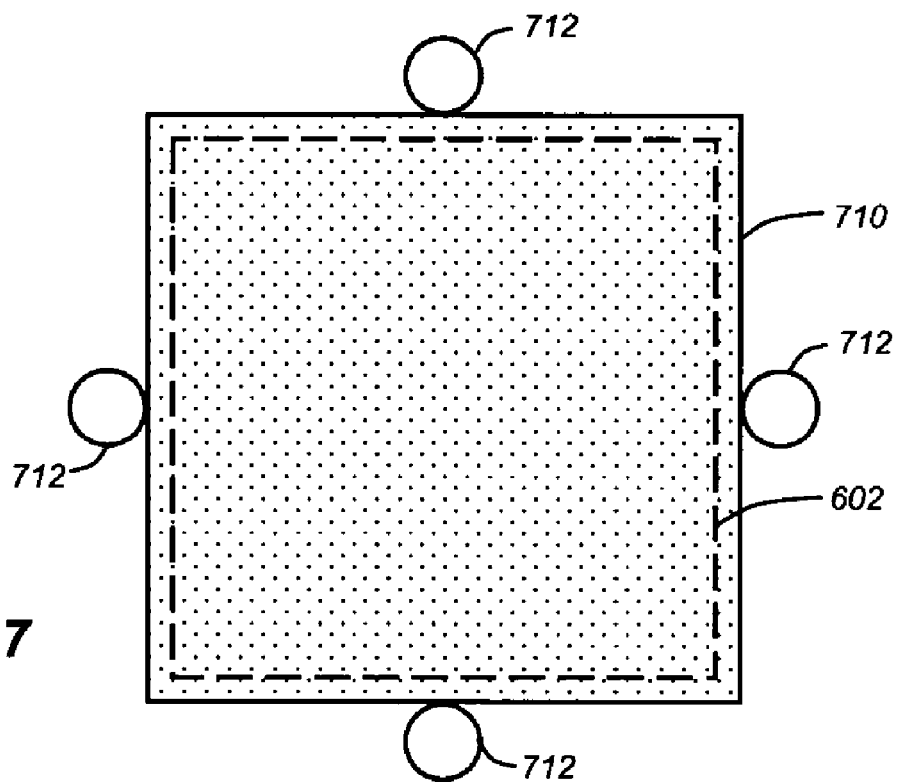
FIG. 7 is a plan view of a rectangular/square illumination pattern projected by the illuminating light pipe of FIG. 5, encompassing the sensor's full field of view.

Two exemplary illumination patterns obtained with the bright field illuminator of FIG. 5 are shown, respectively in FIGS. 6 and 7. In FIG. 6, the field of view of the camera sensor, shown as a dashed line 602, is rectangular, while the circular bright field illuminator projects a circular illumination pattern 604. This may be desirable where the subject has a circular outline and the corners of the field of view are not needed, or where the symbol/subject orientation is unknown. The scanning application and/or image acquisition circuitry can be set to reject data within these corners to speed processing. To ensure that the user aligns the illuminator properly with respect to the subject, four aiming dots 610 are provided around the perimeter of the illumination field 604. These aiming dots give instant feedback to the user so that he or she properly aims the illumination and field of view of the appliance onto the subject. Similarly, as shown in FIG. 7, where a square light pipe is employed, a square illumination pattern 710 is provided. This falls within the relative field of view 602. Again, aiming dots 712 are used to ensure proper direction of the appliance by the user. In this embodiment, the dark field illumination range DB1 spans generally between approximately 0 and 12 inches from the tip 522 of the light pipe. Other ranges are contemplated, of course.

Figure 8:
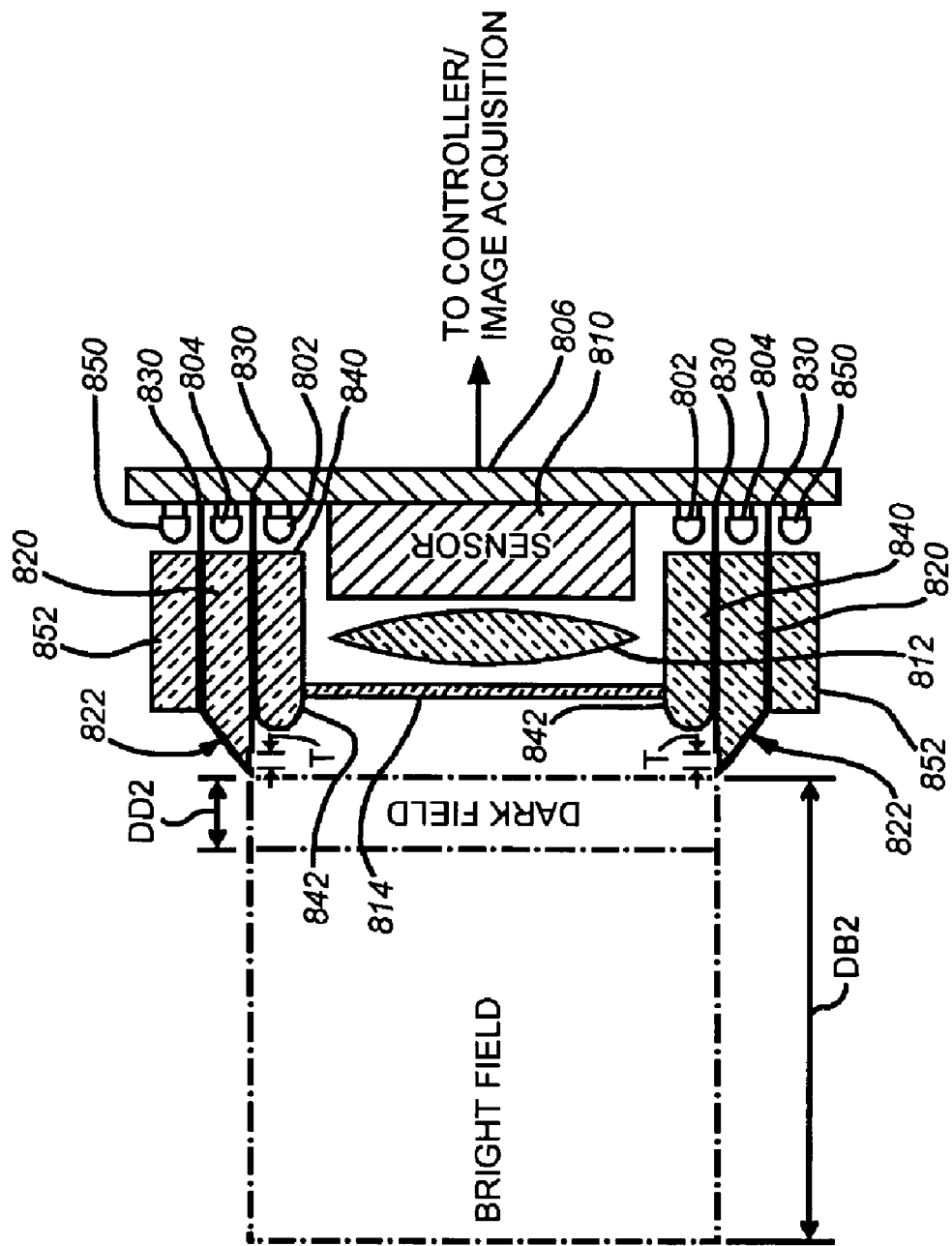
FIG. 8 is a side cross section of a sensor with bright field illuminating light pipe, nested within a dark field illuminating light pipe and aiming illuminators according to an embodiment of this invention.

FIG. 8 shows, in further detail, a nested light pipe arrangement in accordance with an illustrative embodiment of this invention. An inner ring of LEDs 802 and an outer ring of LEDs 804 are mounted on a circuit board 806 that also includes a sensor 810. Associated optics for the sensor 812 are provided within a window area 814. As noted above, the outer light pipe 820 includes a tip 822 that is angled so as to produce, through an opening, thickness T an internally reflected beam of dark field illumination with a span DD2 having a range of 0-1.25 inch in one embodiment. The walls of the light pipe 820 are coated with a non-transmissive, opaque coating and the LEDs 804 of the ring are sealed by baffles 830 that isolate this illumination source with respect to the inner LEDs 802 and associated inner bright field light pipe 840. The bright field light pipe is nested within the dark field light pipe 820 and its tips 842 are recessed so as not to interfere with the opening thickness T. The tips 842 can be rounded, angled or flat. They produce an appropriate bright field illumination pattern that, in this embodiment, can extend a distance DB2 from 0-6 inches with respect to the tip 822 of the dark field illuminator. In this manner, a bright field subject can be contacted by the appliance and still adequately illuminated. Though, for contact viewing of a subject, the inner diameter of the lumen formed by the light pipe assembly must be at least as large in diameter as the subject being viewed. Nevertheless, in certain embodiments, it is contemplated that it is smaller and that the scanning application can include mechanisms for assembling portions of an image formed as the appliance is moved around the image to take in all aspects of it when it is larger than the maximum field of view afforded to the sensor. Again, as noted above, the controller can determine either automatically or manually, whether to activate the dark field illumination ring LEDs 804 or the bright field illumination ring LEDs 802 depending upon the subject and/or image quality obtained. A set of perimeter LEDs 850 communicate with lenses 852 in the form of rods that provide aiming dots as described above.

Figure 9:
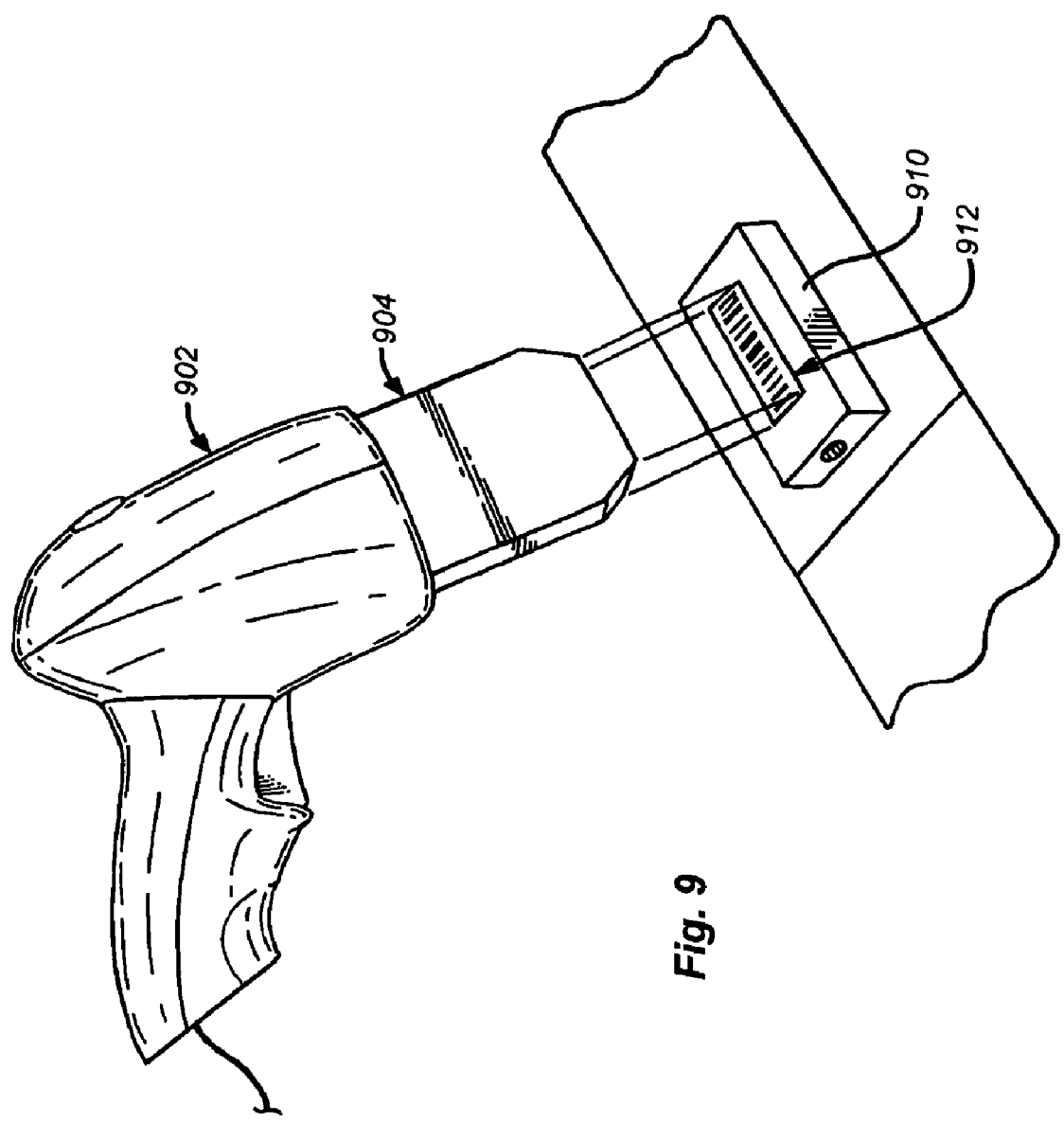
FIG. 9 is a perspective view of a handheld scanning system employing a light pipe that illuminates a modified or restricted sensor field of view according to an alternate embodiment.

As also described generally above, the light pipe can be used to restrict the native field of view of the sensor. FIG. 9 shows a scanning appliance 902 having a rectangular cross-section light pipe 904. This light pipe can either be a dark field or bright field (or combination) illuminator. In this example, an item 910 includes a long, narrow subject 912, namely a one-dimensional bar code. The illuminator projects a pattern similar in size and shape to the bar code itself. In this manner, when the user directs the illumination field to the item 910, he or she is naturally prompted to align the rectangular illumination pattern with the bar code. That is, the user receives immediate feedback as to the location of the reduced field of view, which appears as a bright area that generally conforms to the subject outline. The subject is better delineated by the reduced area, and any information outside this area can be omitted from the acquisition data stream, thus speeding image processing.

Figure 10:
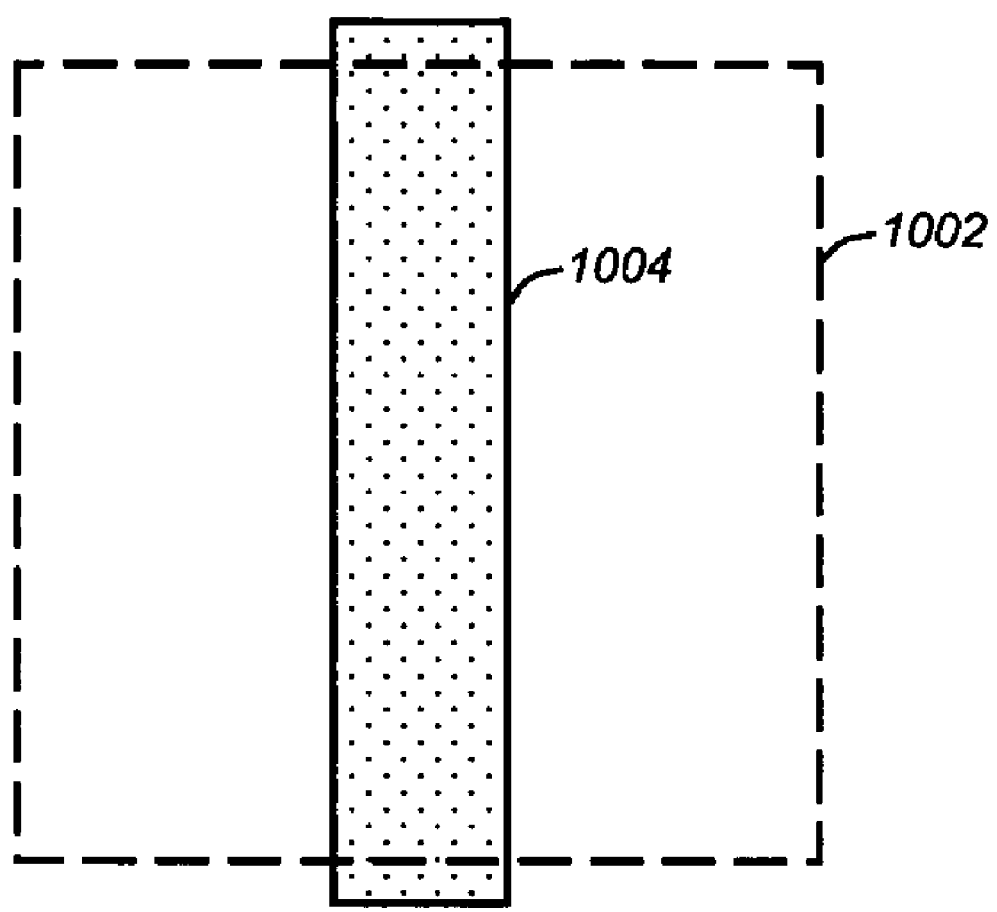
FIG. 10 is a plan view of a rectangular illumination pattern projected by the illuminating light pipe of FIG. 9, encompassing a modified/restricted sensor field of view.

With reference to FIG. 10, the overall field of view of the camera, shown as dashed line 1002, is a large square while the illumination area is a substantially narrower rectangle 1004. Again, this rectangle conforms to the shape of a one-dimensional bar code in this example. A variety of other shapes and sizes can be provided for a selective illumination area with respect to the overall field of view. Small circles, ovals, squares and complex geometric patterns are all contemplated. Appropriately shaped light pipes are constructed to conform to these shapes. Likewise, these light pipes can include dark field, bright field or a combination of bright and dark field structures as described above. Similarly, the narrowed-field of view (or "reduced field of view") illuminator can include aiming dots to further assist alignment on the subject.

Figure 11:
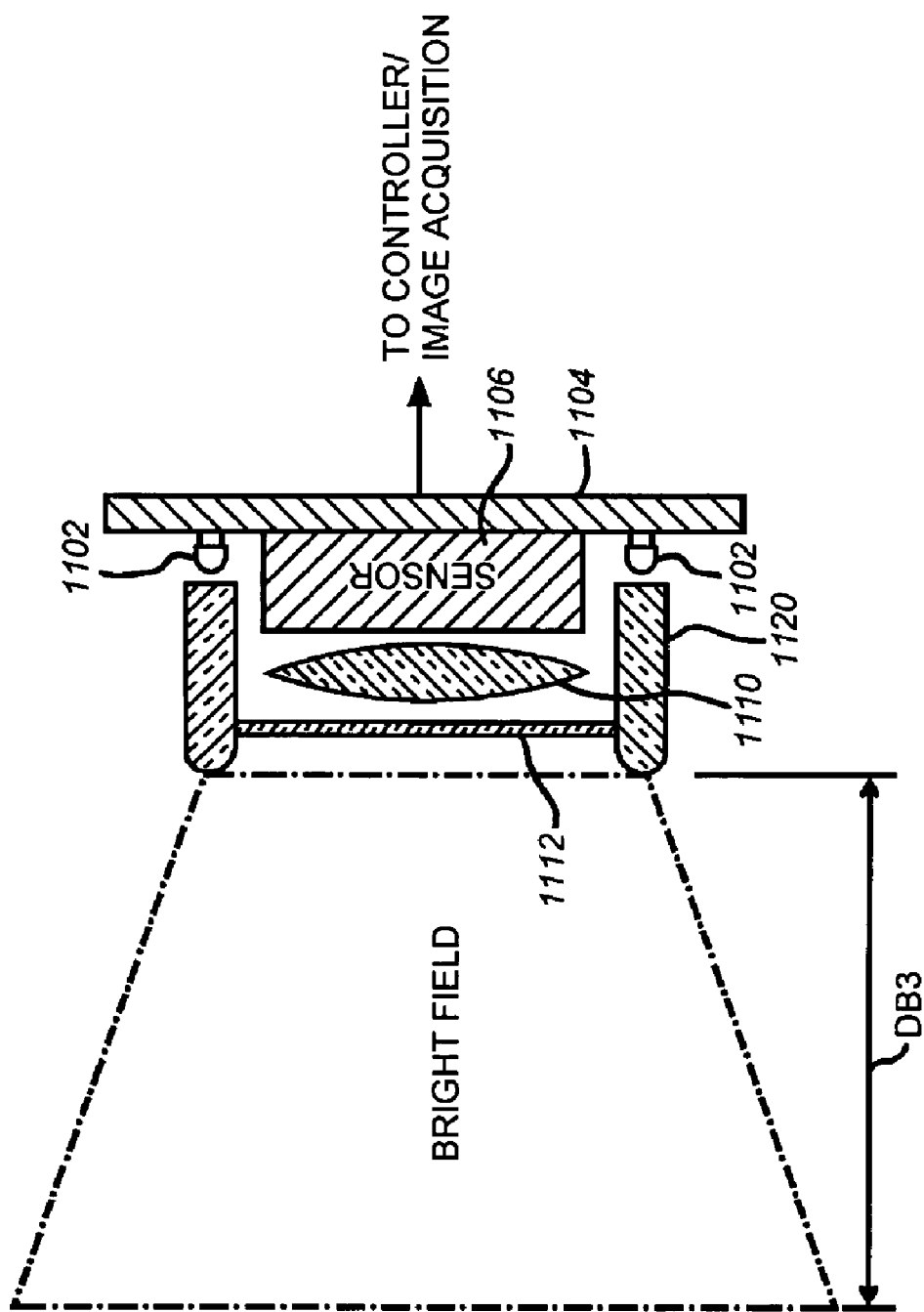
FIG. 11 is a side cross section of the sensor and light pipe illuminator that can be used to generate a predetermined bright field pattern such as, for example that of FIG. 9.

Finally, as shown in FIG. 11, in the example of a bright field illuminator, a ring of LEDs 1102 is mounted on a circuit board 1104, which also includes a sensor 1106. The board is interconnected with a controller or image acquisition device that includes scanning software applications. A bright field illumination pattern extends a distance DB3 from the tip of the light pipe 1120. In this example the distance DB3 is approximately 12 inches. However other distances are expressly contemplated. The scanning software application is adapted to reject pixels outside of the desired field of view either through knowledge of pixel addresses that fall outside of the desired field or because these pixels are not appropriately illuminated and are therefore rejected (e.g., they are too dark). An appropriate optics 1110 and window 1112 is also provided as well as a light pipe 1120 that is shaped as an elongated rectangle.

The foregoing has been a detailed description of illustrative embodiments of this invention. Various modifications and additions can be made without departing from the spirit and scope thereof. For example, it is expressly contemplated that any of the features described in any of the above embodiments can be combined with other features to produce the desired light pipe arrangement. Likewise, a wide variety of data processing devices, scanning application programs and/or hardware systems can be incorporated to control illumination and acquire images. Finally, the light pipes described herein can be provided with integral illuminators on a circuit board that also includes a sensor and control functions that allow the sensor to communicate with the illuminator. Alternatively, the illuminator, light pipe and camera can all be separate components that are interconnected via one or more controllers, or all connected to a common computer or processor through appropriate interfaces. Various combinations of sensor, optics, illuminator and light pipes are all expressly contemplated. For example, sensors may be provided on the same circuit board as the processor and the light sources, or any/all of these components can be separate. Appropriate interfaces and attachment mechanisms, that should be clear to those of ordinary skill, can be provided to facilitate interaction between the various components described herein. In addition, while the bright field light pipe is described as nested within the dark field light pipe, it is expressly contemplated that these two pipes can be reversed by positioning the bright field illuminator outside the dark field light pipe. Likewise, either light pipe (or light source therefor) may be defined as a broken ring, with non-illuminated segments along their perimeters. Accordingly, this description is meant to be taken only by way of example and not to otherwise limit the scope of the invention.

We claim:

1. An image acquisition system including an image sensor for imaging at least a portion of a subject, the system comprising:
   a light pipe defining an inner lumen through which the image sensor views the subject;
   a light source in alignment with a proximal portion of the light pipe, the light source adapted to project a light into the light pipe and through the light pipe, the light pipe including a distal portion adapted to provide a high-angle bright field illumination pattern on the subject with a first portion of the light and to reflect a second portion of the light to provide a low-angle dark field illumination pattern on the subject.

2. The image acquisition system according to claim 1 wherein the light pipe and the light source are each mounted on a handheld scanning appliance.

3. The image acquisition system according to claim 1 further comprising a set of light sources that each project a beam at a predetermined point with respect to the subject to thereby assist aiming of the image sensor at the subject.

4. The image acquisition system according to claim 1 wherein the light pipe is cylindrical.

5. The image acquisition system according to claim 1 wherein the light pipe is rectangular.

6. The image acquisition system according to claim 1 wherein the light pipe is oval.

7. The image acquisition system according to claim 1 wherein the light pipe defines a shape that reduces a field of view of the image sensor.

8. The image acquisition system according to claim 1 wherein the light pipe defines a curved shape.

9. The image acquisition system according to claim 1 wherein the light pipe defines a shape conforming to dimensions of the subject.

10. The image acquisition system according to claim 1 further including an electronic controller that selectively controls predetermined portions of the light source to provide selective illumination to portions of the light pipe.

11. The image acquisition system according to claim 1 wherein the light pipe includes an outer tube and an inner tube.

12. The image acquisition system according to claim 11 wherein the outer tube and the inner tube are cylindrical.

13. The image acquisition system according to claim 11 wherein the outer tube and the inner tube are rectangular.

14. The image acquisition system according to claim 11 wherein the outer tube and the inner tube are oval.

15. The image acquisition system according to claim 11 wherein the outer tube and inner tube are mounted on a handheld scanning appliance.

16. The image acquisition system according to claim 11 wherein the inner tube defines a shape that reduces a field of view of the image sensor.

17. The image acquisition system according to claim 11 wherein the inner tube defines a curved shape.

18. The image acquisition system according to claim 11 wherein the inner tube defines a shape conforming to dimensions of a predetermined subject.

19. The image acquisition system according to claim 11 further comprising a set of light sources that each project a beam at a predetermined point with respect to the subject to thereby assist aiming of the image sensor at the subject.

* * * * *